(12) United States Patent
Kondo

(10) Patent No.: US 9,225,870 B2
(45) Date of Patent: Dec. 29, 2015

(54) DATA CONVERSION APPARATUS, RECORDING APPARATUS INCLUDING THE DATA CONVERSION APPARATUS, AND DATA CONVERSION METHOD

(71) Applicant: CANON KABUSHIKI KAISHA, Tokyo (JP)

(72) Inventor: Mitsuru Kondo, Kawasaki-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/666,835

(22) Filed: Nov. 1, 2012

(65) Prior Publication Data

US 2013/0057877 A1   Mar. 7, 2013

Related U.S. Application Data

(63) Continuation of application No. 12/188,890, filed on Aug. 8, 2008, now Pat. No. 8,325,818.

(30) Foreign Application Priority Data

Aug. 10, 2007  (JP) ................................ 2007-209599

(51) Int. Cl.
  *H04B 1/66* (2006.01)
  *G06K 15/00* (2006.01)
  *G06K 15/02* (2006.01)
  *H04N 1/191* (2006.01)
(52) U.S. Cl.
  CPC .......... *H04N 1/1911* (2013.01); *G06K 15/1836* (2013.01); *G06K 15/1852* (2013.01); *H04N 2201/0082* (2013.01)

(58) Field of Classification Search
  None
  See application file for complete search history.

(56) References Cited

U.S. PATENT DOCUMENTS

| 5,706,105 A * | 1/1998 | Naylor, Jr. ........... H04N 1/4051 358/3.14 |
| 2002/0085232 A1* | 7/2002 | Zeck .................... H04N 1/4058 358/3.03 |
| 2003/0081258 A1* | 5/2003 | Sugizaki .............. H04N 1/4055 358/3.14 |

* cited by examiner

*Primary Examiner* — Christopher Crutchfield
(74) *Attorney, Agent, or Firm* — Canon U.S.A., Inc. IP Division

(57) ABSTRACT

A data conversion apparatus which converts data including a K pixel amount of bit data expressed as N bits/1 pixel, where N and K are plural, using conversion data of predetermined bits comprising: a holding unit configured to hold input data in K×N bits; an acquisition unit configured to acquire from the conversion data a number of bit patterns corresponding to a decimal value expressed by N bits among a conversion target to convert the input data held by the holding unit by N-bit units; a storage unit configured to store a pattern of N bits corresponding to a decimal value obtained from a bit pattern acquired by the acquisition unit in a bit position of the conversion target; and an updating unit configured to update the bit position of the conversion target each time the acquisition unit and the storage unit perform processing.

25 Claims, 12 Drawing Sheets

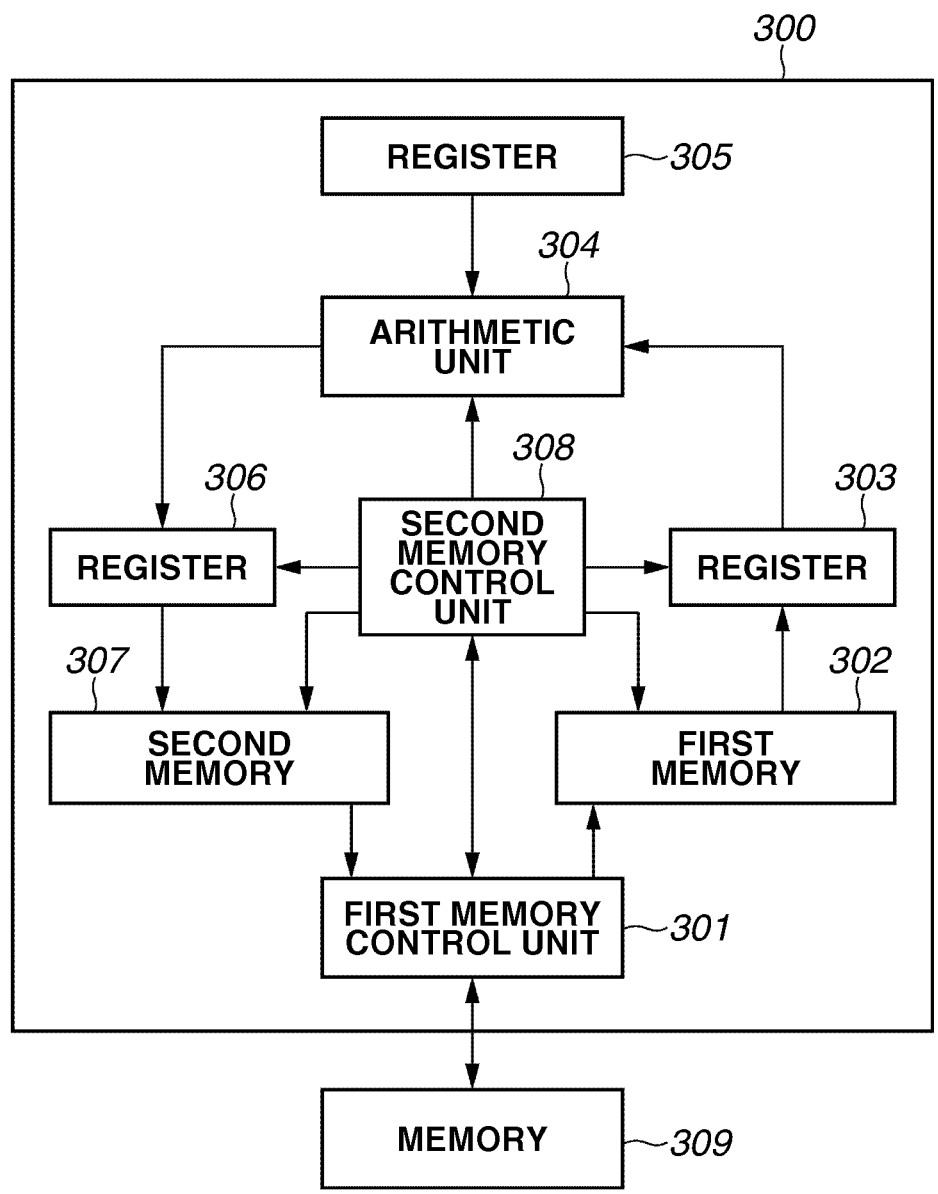

FIG.6
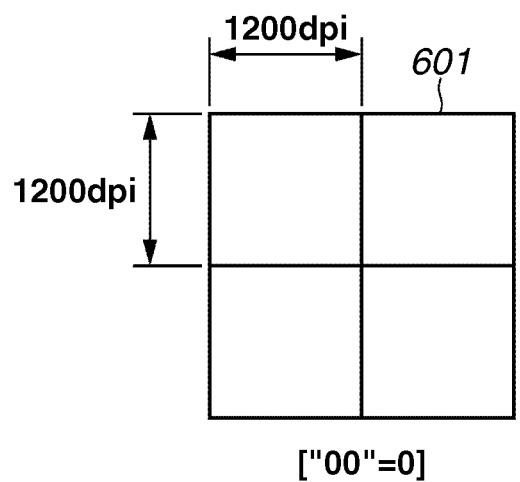
["00"=0]
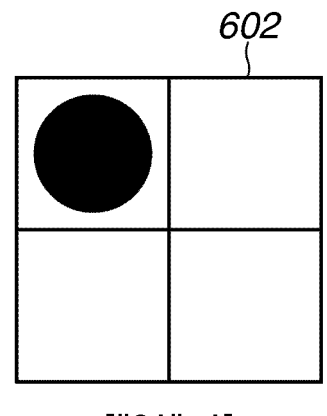
["01"=1]
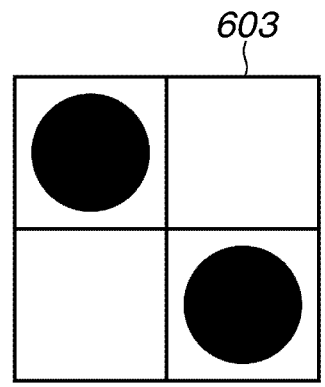
["10"=2]
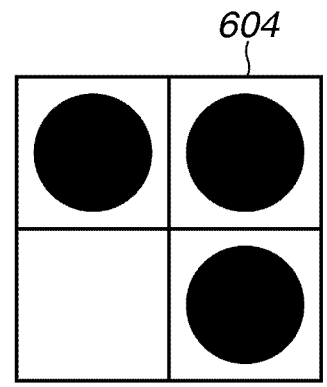
["11"=3]

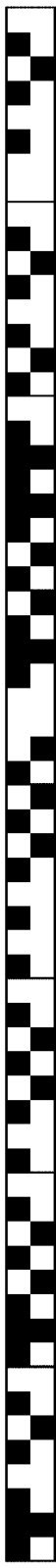
FIG.10A
FIG.10B
FIG.10C
FIG.10D
1 1 1 0 1 1 0 1 1 0 1
FIG.10E
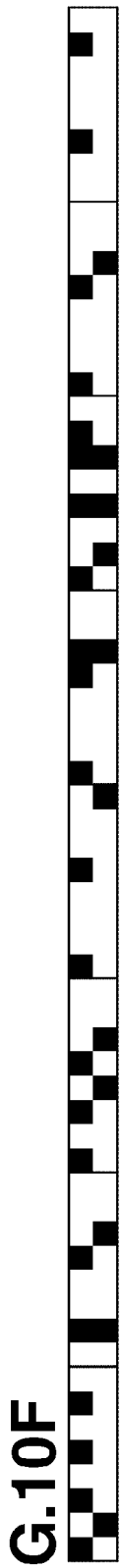
FIG.10F
FIG.10G
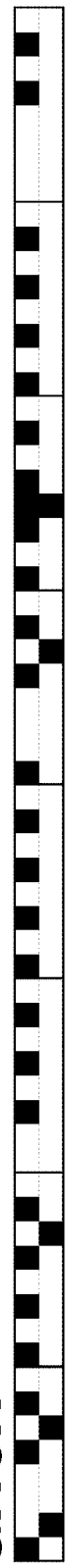
FIG.10H

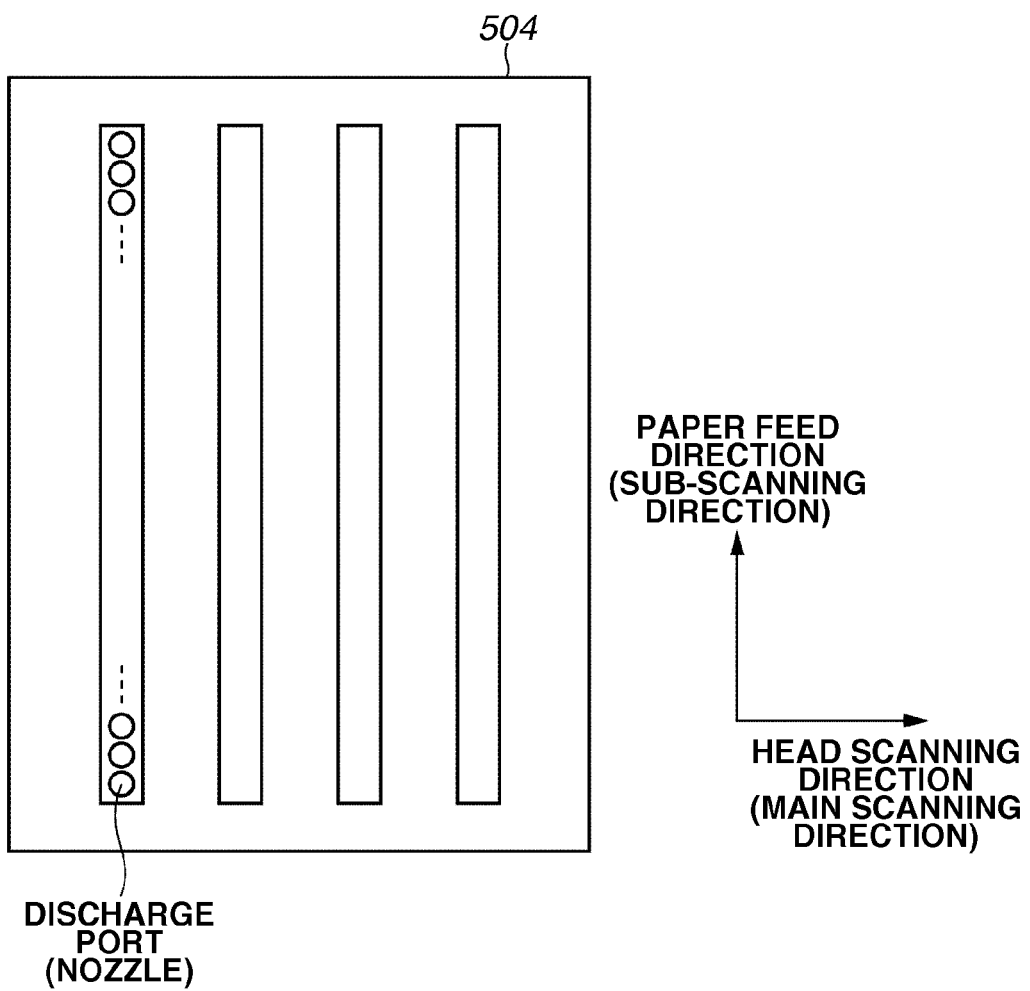

US 9,225,870 B2

DATA CONVERSION APPARATUS, RECORDING APPARATUS INCLUDING THE DATA CONVERSION APPARATUS, AND DATA CONVERSION METHOD

CROSS-REFERENCE TO RELATED APPLICATIONS

This application is a continuation of U.S. patent application Ser. No. 12/188,890, filed Aug. 8, 2008, which claims the benefit of Japanese Application No. 2007-209599, filed Aug. 10, 2007, both of which are hereby incorporated by reference herein in their entirety.

BACKGROUND OF THE INVENTION

1. Field of the Invention

The present invention relates to a data conversion apparatus for converting data, a data conversion method, and a recording apparatus including the data conversion apparatus.

2. Description of the Related Art

The needs of users who wish to print at high speed when recording onto a recording medium with a recording apparatus are increasing. When printing while emphasizing high speed, a method in which the number of passes is decreased during multipass printing, which is used to realize high image quality, is effective. Here, the expression "number of printing passes" is the number of cartridge scans required to complete one line.

Since the number of discharge ports of a recording head is a certain fixed value, the greater the number of passes, the more the paper feed amount for a single pass is decreased. On the other hand, the smaller the number of passes, the more the paper feed amount for a single pass can be increased. For example, if printing that is performed with two passes can be performed with one pass, a simple calculation shows that speed can be increased by a factor of two. More specifically, the lower the number of passes, the more the number of cartridge scans required for recording a given region (e.g., 1 sheet) can be decreased, and the larger the paper feed amount for a single pass becomes. As a result, the time required for printing one sheet can be shortened.

Printing is performed by scanning in a direction which is approximately perpendicular to the discharge port array direction with a recording head. The recording head has a plurality of discharge ports which discharge a recording liquid (ink). Accordingly, when printing is performed in one pass, from a single scan a belt-like image region (band) is formed.

Since a one band region is formed from a single scan when printing in this manner in one pass, the duty (percentage) of recording ink printed onto the recording medium from one scan is greater than multipass printing which forms a one band region from multiple scans. Therefore, in a case of one pass printing, the appearance of a black streak (stripe) between passes (between bands) in portions of high printing duty is notable although its degree varies depending on properties of the recording medium or the recording liquid.

This black streak appearance is more noticeable when head structures is configured such that a recording head which discharges a plurality of different recording inks (cyan, magenta, yellow etc.) is arranged in a main scanning direction, a so-called "lateral configuration". This is because the joint (connecting) positions of the respective colors appear at the same place.

Such black streaks appearing at the boundary portion between adjacent bands are also called "joint streaks" and "banding" and "connecting stripe". If a joint streak appears, print quality deteriorates.

Japanese Patent Application Laid-Open No. 11-188898 discusses a method which, when recording one band at a time and repeatedly scanning the recording head in a main scanning direction, prevents the appearance of streaks in the joint (connecting) portions of a recording region for each of those bands. This method divides at least either the first raster or the last raster in a one-band region to be recorded, into unit regions having a predefined dot number, and then thins-out the print data based on binary data of those regions. This thinning-out is performed in a predefined preferential order according to the total of the ink discharge amount of a target color and the discharge amount of the other inks, in each unit region. By thinning-out the data in this manner, the discharge amount of the target ink is decreased.

Further, an example of another thinning-out method is to count the dot number in a unit region and determine the thinning-out ratio from that result. Based on this thinning-out ratio, the data to be printed is subjected to thinning-out processing (refer to Japanese Patent Application Laid-Open No. 2002-96460).

Recently, the number of ink colors and the number of discharge ports of the respective ink colors mounted on the recording head have been increasing, which has resulted in an expansion in the amount of data being processed by the recording apparatus. Accordingly, for example, image data expressed as multivalued data (multivalued information) rather than binary data is input from a host apparatus. Therefore, the recording apparatus converts the multivalued data input in the apparatus into binary data, transfers that converted data to the recording head, and prints the data onto a recording medium.

In Japanese Patent Application Laid-Open No. 2002-96460, it is discussed to perform thinning-out processing when converting RGB multivalued data into CMYK multivalued data.

However, Japanese Patent Application Laid-Open No. 2002-96460 does not specifically discuss how to perform the thinning-out in a case of the multivalued data.

On the other hand, various types of data are input into a recording apparatus from the host apparatus. Examples of such data include binary data, multivalued data expressed as 2-bits, and multivalued data expressed as 4-bits. Thus, a recording apparatus into which various types of data are input needs to have a thinning-out processing circuit corresponding to the data types. In an apparatus having such a configuration, the scale of the thinning-out processing circuit increases as the more types of data are provided.

SUMMARY OF THE INVENTION

The present invention is directed to a data conversion apparatus and a recording apparatus which can efficiently perform conversion processing (thinning-out processing) whether the received image data is multivalued data or binary data.

According to an aspect of the present invention, a data conversion apparatus which converts data including a K pixel amount of bit data expressed as N bits/1 pixel, where N and K are plural, using conversion data of predetermined bits comprising: a holding unit configured to hold input data in K×N bits; an acquisition unit configured to acquire from the conversion data a number of bit patterns corresponding to a decimal value expressed by N bits among a conversion target to convert the input data held by the holding unit by N-bit units; a storage unit configured to store a pattern of N bits corresponding to a decimal value obtained from a bit pattern acquired by the acquisition unit in a bit position of the conversion target; and an updating unit configured to update the bit position of the conversion target each time the acquisition unit and the storage unit perform processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a block diagram describing the data conversion apparatus according to an exemplary embodiment of the present invention.

FIG. 6 is a view illustrating a table for converting multivalued data into binary data according to an exemplary embodiment of the present invention.

FIGS. 10A to 10H are diagrams illustrating a comparison of the thinning-out processing results according to an exemplary embodiment of the present invention.

FIG. 11 is a diagram describing the structure of the recording head used by the recording apparatus according to an exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
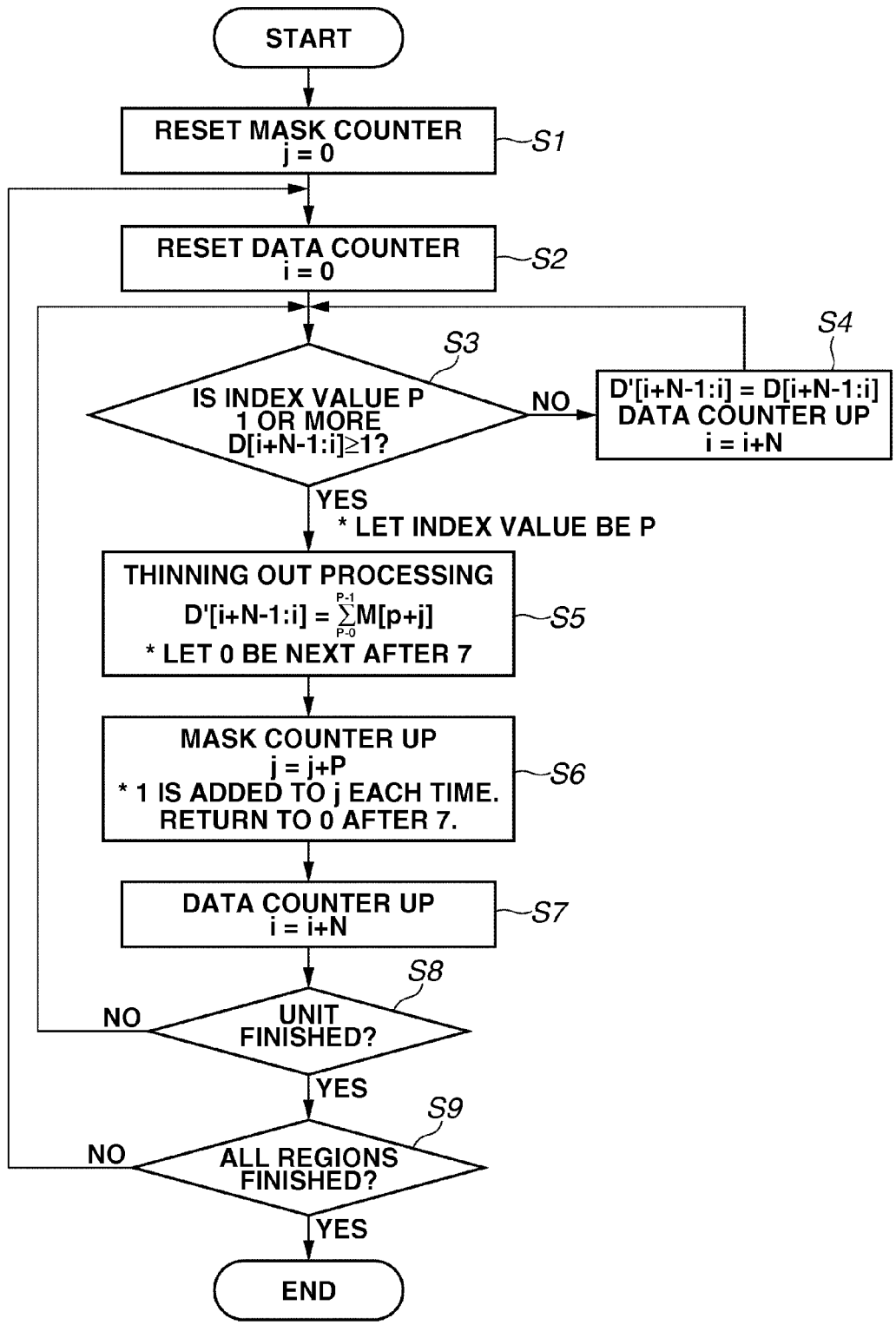
FIG. 1 is a flowchart of the N-bit multivalued data thinning-out processing according to an exemplary embodiment of the present invention.

FIG. 1 is a diagram of a processing flowchart in which a data conversion apparatus 300 (FIG. 3) performs thinning-out processing on one data unit expressed as L bits configured from K pixels (K is plural) in which one pixel is expressed as N-bit (N is plural) multivalued data and binary data. The bit number of the multivalued data is given as N. The unit which is subjected to the thinning-out processing is L bits (K×N). The conversion processing is performed by N bit units on data of L bits.

Figure 4A:
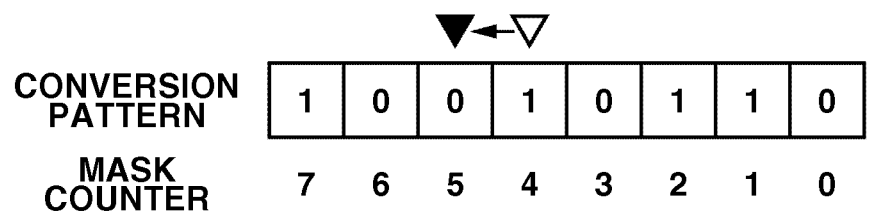
FIGS. 4A and 4B are explanatory diagrams illustrating access to the mask pattern according to an exemplary embodiment of the present invention.

This thinning-out processing is performed using an 8-bit conversion pattern (conversion data) as illustrated in FIG. 4A. FIG. 4A is one example of a conversion pattern. The black inverted triangle is a pointer indicating the position (bit) corresponding to the value of the mask counter j. This pointer is updated from a lower bit to a higher bit direction. When the pointer reaches the highest bit, a control operation is performed to return the pointer to the lowest bit. Thus, the bit position designated by the pointer changes.

Figure 4B:
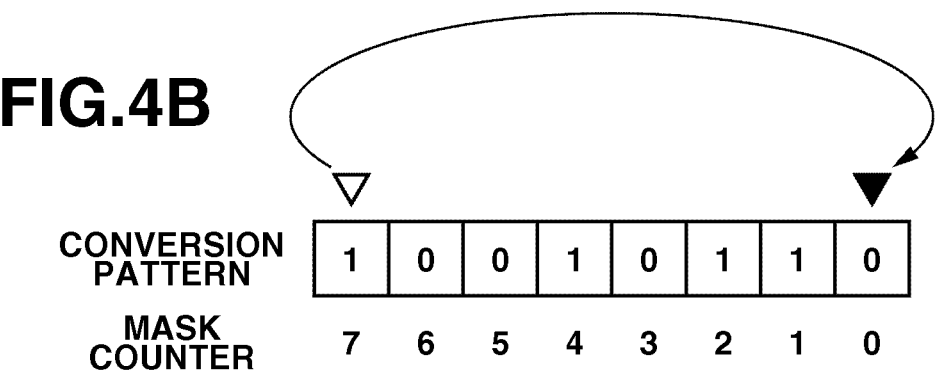

FIG. 4A describes how the value of the mask counter is updated from 4 to 5. FIG. 4B describes how the value of the mask counter is updated from 7 to 0. If the mask counter indicates 7, the value is returned to 0 when updating. Here, the bit where the mask counter corresponds to 7 is represented as the highest bit, and the bit where the mask counter corresponds to 0 is represented as the lowest bit.

In FIG. 1, D denotes the target data to be thinned-out (converted), and represents one data unit. This D represents pre-thinning-out processing data. D' represents post-thinning-out processing data. These data representations will now be described in more detail. Here, D will be described for the case of 8-bit data. For example, D[0] denotes a 1-bit amount of data corresponding to bit 0 in the data. Further, D[1:0] denotes a 2-bit amount of data corresponding to bit 1 and bit 0 in the data. Further, D[5:3] denotes a 3-bit amount of data corresponding to bit 5, bit 4, and bit 3 in the data. This is also the same for D'.

While the thinning-out processing will now be described, prior to executing the thinning-out processing, the values for N and K are assumed to have already been obtained. The values are obtained by, for example, sending the information concerning the values for N and K along with the recording data from a host apparatus connected to the recording apparatus.

In step S1, the data conversion apparatus 300 initializes the counter J. J denotes the value of the mask counter. In step S2, the data conversion apparatus 300 initializes the counter I. I denotes the value of the data counter.

In step S3, the data conversion apparatus 300 determines whether the index value P of a target pixel is 0 or not. If the index value P is 0 (NO in step S3), the processing proceeds on to step S4. In step S4, the data conversion apparatus 300 sets the data D as data D' as is; that is, does not perform a conversion. If the index value P is not 0 (YES in step S3), the processing proceeds on to step S5.

In step S5, the data conversion apparatus 300 performs thinning-out processing. In this thinning-out processing, the sum of the index value P and the same number of bits in the mask pattern (conversion pattern) is set as the post-thinning-out processing data. More specifically, a process represented by $$D'[i+N-1:i] = \sum_{p=0}^{P-1} M[p+j]$$

is performed where M is bit data of the mask pattern.

For example, if the index value P is 3, a 3-bit amount of data is extracted, and the data of that extracted 3-bit amount is added. If the index value P is 5, a 5-bit amount of data is extracted, and the data of that extracted 5-bit amount is added.

For example, M[0] denotes the value of the mask pattern bit 0 (mask counter 0 position). In FIG. 4A, M[0]=0. M[1] denotes the value of the mask pattern bit 1 (mask counter 1 position). In FIG. 4A, M[1]=1.

Returning now to the description of the processing flow of FIG. 1, in step S6, the data conversion apparatus 300 adds the index value P to the value of the mask counter. In other words, the data conversion apparatus 300 updates the value of the mask counter by the index value P amount.

Returning now to the description of the processing flow of FIG. 1, in step S7, the data conversion apparatus 300 adds a bit number N amount to the value of the data counter. In other words, the data conversion apparatus 300 updates the value of the mask counter by a bit number N amount of the multivalued data.

In step S8, the data conversion apparatus 300 determines whether the processing of one unit amount (K pixel amount) has finished. In other words, the data conversion apparatus 300 determines whether the data conversion of L bit units has finished. In step S9, the data conversion apparatus 300 determines whether data conversion for all of the unit regions has finished.

In this processing, if N=1, thinning-out processing of binary data is performed.

Next, a specific example of the data will be described.
<Processing in the Case of 2-Bit Multivalued Data>

Figure 2:
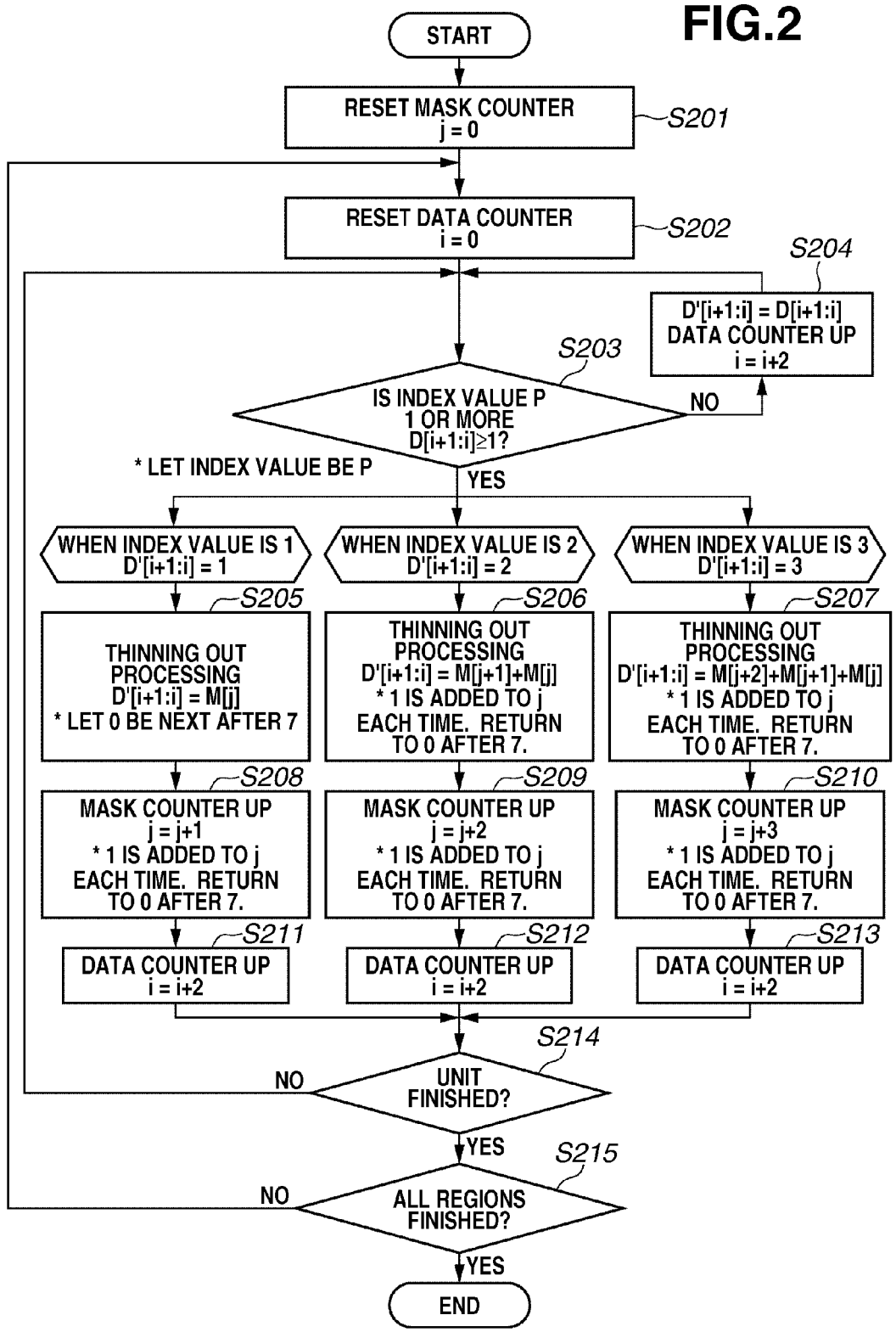
FIG. 2 is a flowchart of the 2-bit multivalued data thinning-out processing according to an exemplary embodiment of the present invention.

FIG. 2 illustrates the processing flow when the data is 2-bit multivalued data. Here, the unit whose data is subjected to thinning-out processing has L=8 bits. More specifically, pixel number K=4, bit number N expressing a multivalue=2. Here, a case will be described where the quantity of data to be processed is 20 units (80 pixels). For example, the index value P may be a value among any of 0 to 3.

This thinning-out processing starts by a 2-bit unit from the lower bit side and continues in order towards the higher bit side. More specifically, first, the data of bit 0 and bit 1 are processed. Next, the data of bit 2 and bit 3 are processed.

First, in step S201, the data conversion apparatus 300 resets the mask counter j to 0. In step S202, the data conversion apparatus 300 resets the data counter i to 0. In step S203, the data conversion apparatus 300 determines whether the index value P of the target pixel is 1 or more. If the index value P is 1 or more (YES in step S203), the processing proceeds on to step S205 to S207 according to that value. If the index value P is 0 (NO in step S203), the processing proceeds on to step S204.

In step S204, the original data D[i+1:1] is substituted, without conversion, for the post-thinning-out processing data D'[i+1:1], the data counter i moves forward by 2, and the processing proceeds on to the next pixel.

In steps S205 to S213, thinning-out processing is performed based on the index value of the target pixel. More specifically, thinning-out processing is performed using the mask pattern of the same bit number amount as the index value.

For example, in step S205, if the index value of the target pixel is "01", namely 1, the data conversion apparatus 300 uses the 1 bits of mask pattern to obtain the sum of the respective bits of the mask pattern. This sum is taken as the post-thinning-out processing data.

Then, in step S208, data conversion apparatus 300 updates the counter j of the mask pattern by just the used bit number, and returns j to 0 when it reaches 7. Thus, the mask pattern is used in a cyclic manner (refer to FIG. 4B). Then, in step S211, the data conversion apparatus 300 updates the data counter by just 2, and prepares for the processing of the adjacent pixel which will be processed next.

Then, in step S206, if the index value of the target pixel is "10", namely 2, the data conversion apparatus 300 uses the 2 bits of mask pattern to obtain the sum of the respective bits of the mask pattern. This sum is taken as the post-thinning-out processing data.

Then, in step S209, data conversion apparatus 300 updates the counter j of the mask pattern by just the used bit number, and returns j to 0 when it reaches 7. Thus, the mask pattern is used in a cyclic manner (refer to FIG. 4B). Then, in step S212, the data conversion apparatus 300 updates the data counter by just 2, and prepares for the processing of the adjacent pixel which will be processed next.

Then, in step S207, if the index value of the target pixel is "11", namely 3, the data conversion apparatus 300 uses the 3 bits of mask pattern to obtain the sum of the respective bits of the mask pattern. This sum is taken as the post-thinning-out processing data.

Then, in step S210, data conversion apparatus 300 updates the counter j of the mask pattern by just the used bit number, and returns j to 0 when it reaches 7. Thus, the mask pattern is used in a cyclic manner (refer to FIG. 4B). Then, in step S213, the data conversion apparatus 300 updates the data counter by just 2, and prepares for the processing of the adjacent pixel which will be processed next.

In step S214, the data conversion apparatus 300 determines whether the processing for a one unit amount (4 pixels) has finished. If the processing has finished (YES in step S214), the processing proceeds on to step S215. If the processing has not finished (NO in step S214), the processing processes the next pixel. In step S215, the data conversion apparatus 300 determines whether the thinning-out processing has been completed for all of the thinning-out target regions. If the processing has been completed (YES in step S215), the processing is finished. If the processing has not been completed (NO in step S215), the processing returns to step S202, and the data conversion apparatus 300 processes the next unit.

Here, when proceeding on to the processing of the next unit, the processing returns to step S202 because although the data processing is performed in 8-bit units, the conversion target data is sequentially aligned image data. Therefore, the value of the counter j of the mask pattern is held without initializing it for continued use in the next data as well. As a result of this processing, smooth and uniform thinning-out processing can be realized.

Figure 7:
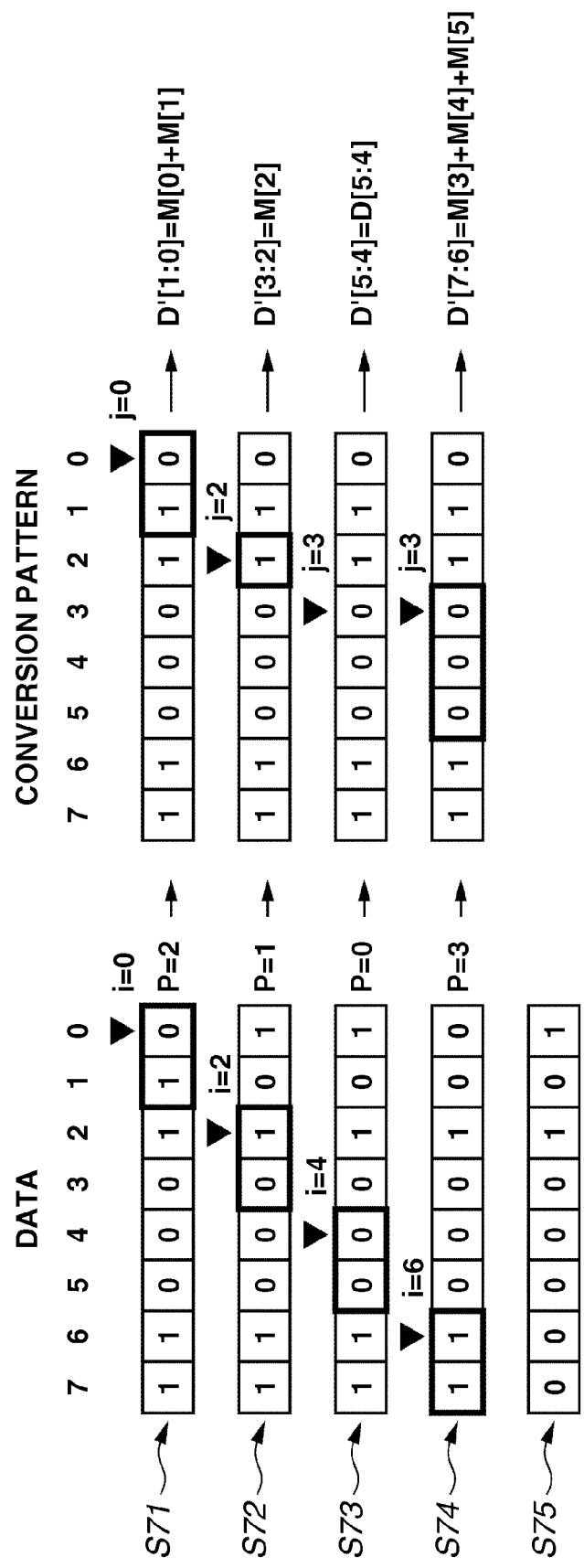
FIG. 7 is an explanatory diagram of the 2-bit multivalued data thinning-out processing according to an exemplary embodiment of the present invention.

FIG. 7 is an explanatory diagram of the thinning-out processing of the 2-bit multivalued data described in FIG. 2. In FIG. 7, thinning-out processing (data conversion processing) is performed for data D[7:0]="11000110". In the case of 2-bit multivalued data, the processing is performed in 2-bit units. The processing starts from a pixel on the lower bit side. Here, the value j of the mask counter is 0.

First, in step S71, since the index value (decimal value) P of the first pixel is 2, the data conversion apparatus 300 extracts a 2-bit amount of data corresponding to the mask counter 0 and the mask counter 1 of the mask pattern. More specifically, the data conversion apparatus 300 acquires a number of bit patterns corresponding to the value expressed by the index value P. Then, the data conversion apparatus 300 sets the sum of these (M[0]+M[1]=1="01") as the post-thinning-out data D'[1:0] of the first pixel. Since the index value (decimal value) P is 2, the value j of the mask counter after the conversion is updated from 0 to 2.

In step S72, since the index value P of the second pixel is 1, the data conversion apparatus 300 uses 1 bit (M[2]) of the mask counter 2 in the mask pattern. Therefore, D'[3:2] is "01". Further, the value j of the mask counter is updated from 2 to 3.

In step S73, the data conversion apparatus 300 moves on to the processing of the third pixel. Since the index value P is 0, thinning-out processing using the mask pattern is not performed, so that the data D[5:4] becomes the post-thinning-out data D'[5:4] as is. Here, since P=0, the value of the mask counter is not updated, and j is still 3.

In step S74, the data conversion apparatus 300 moves on to the processing of the fourth pixel. Since the index value P is 3, the sum (M[3]+M[4]+M[5]="00") of the 3 bit amount from the mask counter 3 to the mask counter 5 in the mask pattern is post-thinning-out data D'[7:6]. Since P=3, the value of the mask counter is updated so that j=6. The value of this mask counter is held until the data of all the regions is processed, and is used in the processing of the next data.

Then, in step S75, D'[7:0] is "00000101".

As a result of the above processing, the processing of a 1 unit, 4-pixel amount is completed. The input data D[7:0] ="11000110" is converted by the thinning-out processing into D'[7:0]="00000101".

<Explanatory Diagram of the Data Processing of 4-Bit Multivalued Data>

Figure 8:
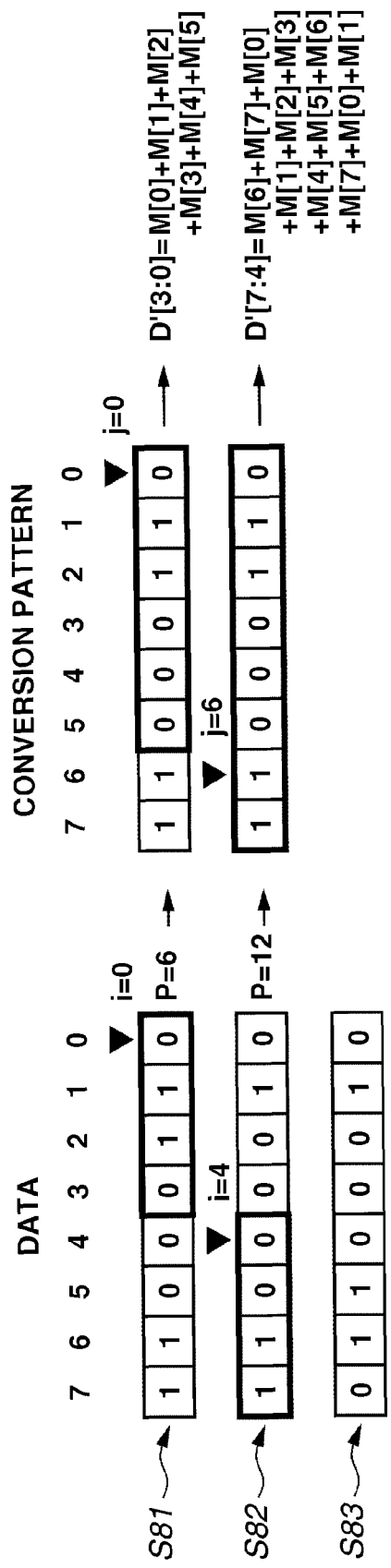
FIG. 8 is an explanatory diagram of the 4-bit multivalued data thinning-out processing according to an exemplary embodiment of the present invention.

FIG. 8 is an explanatory diagram of 4-bit multivalued data thinning-out processing. FIG. 8 describes the thinning-out processing of data D[7:0]="11000110". It is noted that this data D[7:0] is a 2 pixel amount of 8-bit data. More specifically, the pixel number K=2 and the bit number N expressing a multivalue=4. In this case, for example, the index value P may be any value between 0 and 15. The same processing is performed as that described above except that only the bit number is different from the above thinning-out processing with the 2-bit multivalued data. Here, the value j of the mask counter is 0.

In step S81, the index value P of the first pixel is 6. Therefore, the data conversion apparatus 300 extracts a 6-bit amount of data from the mask counter 0 to the mask counter 5 of the mask pattern. Then, the data conversion apparatus 300 sets the sum of these (M[0]+M[1]+M[2]+M[3]+M[4]+M[5]=2="0010") as the post-thinning-out data D'[3:0] of the first pixel. The data conversion apparatus 300 then updates the value of the mask counter from 0 to 6.

In step S82, the index value P of the second pixel is 12. Therefore, the data conversion apparatus 300 uses a 12-bit amount from the value 6 of the mask counter in the mask pattern. The processing moves on to the mask counter 0 which is next after the mask counter 7. More specifically, after the highest bit, the data of the lowest bit is used. Thus, the mask pattern is used in a cyclic manner (refer to FIG. 4B).

Therefore, post-thinning-out data D'[7:4] of the second pixel is the sum of the mask pattern 12-bit amount (M[6]+M[7]+M[0]+M[1]+M[2]+M[3]+M[4]+M[5]+M[6]+M[7]+M[0]+M[1]=7="0111"). The data conversion apparatus 300 updates the value of the mask counter from 6 to 2.

In step S83, the D'[7:0] becomes "01110010".

As a result of the above processing, the processing of a one unit, 2-pixel amount, is completed. The input data D[7:0] ="11000110" is converted by thinning-out processing to D'[7:0]="01110010".

<Explanatory Diagram of the Data Processing of Binary Data>

Figure 9:
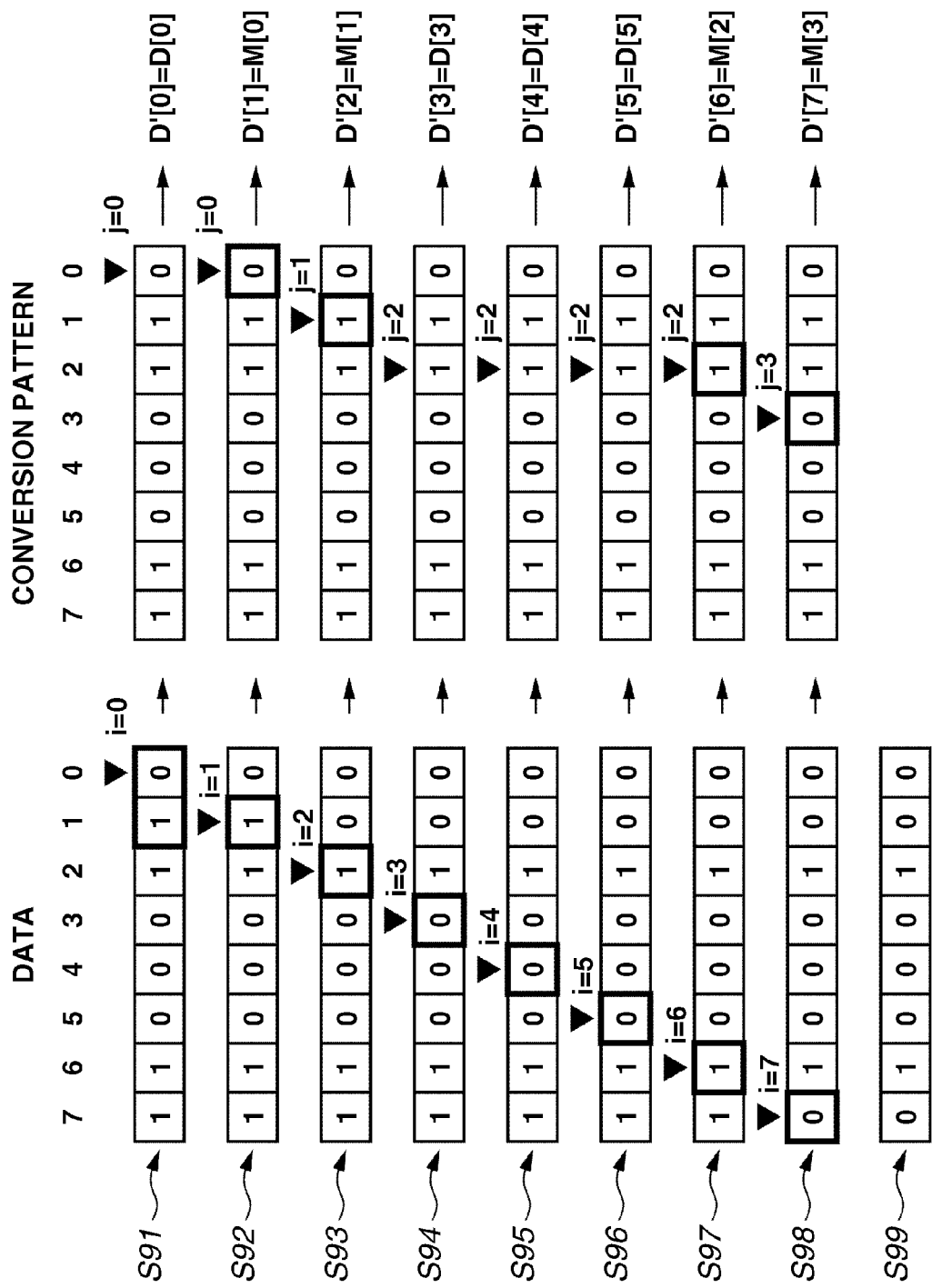
FIG. 9 is an explanatory diagram of the binary data thinning-out processing according to an exemplary embodiment of the present invention.

FIG. 9 is an explanatory diagram of the processing of binary data, in which an 8 pixel amount of data is subjected to the thinning-out processing of D[7:0]="11000110". It is noted that this data D[7:0] is an 8 pixel amount. The binary data may be expressed in another way as multivalue (N=1) data. More specifically, the pixel number K=8 and the bit number N expressing a multivalue=1.

In step S91, since the data of the first pixel is 0, thinning-out processing using the mask pattern is not performed, so that the input print data D[0] becomes the post-thinning-out data D'[0] as is. The value of the mask counter j is still 0. In step S92, since the data of the second pixel is 1, the post-thinning-out data D'[0] is replaced with M[0] of the lowest bit of the mask pattern. Then, the mask counter j is updated from 0 to 1.

In step S93, since the data of the third pixel is 1, the post-thinning-out data D'[0] is replaced with M[1] based on the mask counter 1 in the mask pattern. Then, the mask counter j is updated from 1 to 2.

In step S94, since the data of the fourth pixel is 0, thinning-out processing using the mask pattern is not performed, so that the input print data D[3] becomes the post-thinning-out data D'[3] as is. In step S95, since the data of the fifth pixel is 0, thinning-out processing using the mask pattern is not performed, so that the input print data D[4] becomes the post-thinning-out data D'[4] as is.

In step S96, since the data of the sixth pixel is 0, thinning-out processing using the mask pattern is not performed, so that the input print data D[5] becomes the post-thinning-out data D'[5] as is. In step S97, since the data of the seventh pixel is 1, the post-thinning-out data D'[6] is replaced with M[2] based on the value 2 of the mask counter in the mask pattern.

In step S98, since the data of the eighth pixel is 0, thinning-out processing using the mask pattern is not performed, so that the input print data D[7] becomes the post-thinning-out data D'[7] as is. In step S99, the processing of the eighth pixel is finished, in which the data D[7:0]="11000110" is converted by thinning-out processing to D'[7:0]="01000100".

<Comparison of the Thinning-Out Results of the Multivalued Data with the Thinning-Out Results of the Binary Data>

FIGS. 10A to 10H are diagrams illustrating a comparison of the thinning-out results of the multivalued data (2-bit multivalued data) with the thinning-out results of the binary data as described above.

FIG. 10A illustrates a bitmap image of an 8-unit (total of 128 pixels) amount of data, in which one unit is composed of an 8 pixel amount in the horizontal direction and a 2 pixel amount in the vertical direction of the drawing, for pixels (frames) with 1200 dpi×1200 dpi data of the processing target. Expressed in another way, this 128 pixel data amount is equivalent to a two raster amount of 64 pixel data per raster. In each of the frames in FIG. 10A, a dot is arranged in the frames (pixels) which are colored with black. In the example illustrated here, dots are arranged in 53 of the 128 pixels, which gives a printing density of about 20.7%.

FIG. 10B is a diagram expressing FIG. 10A in terms of binary data. FIG. 10C is a diagram expressing FIG. 10A in terms of 2-bit multivalued data. The array direction of the bits of this 2-bit multivalued data corresponds to the raster direction (scanning direction of the recording head).

FIG. 10D illustrates a mask pattern (conversion pattern). The array of the bits of this mask pattern is the same as the array direction of the bits of the 2-bit multivalued data.

FIG. 10E is a diagram which expresses the results of thinning-out processing performed using the mask pattern of FIG. 10D in terms of binary data. FIG. 10F is a diagram illustrating a bitmap image of FIG. 10E. FIG. 10G is a diagram which expresses the results of thinning-out processing performed using the mask pattern of FIG. 10D in terms of 2-bit multivalued data. FIG. 10H is a diagram illustrating a bitmap image of FIG. 10G.

The mask pattern illustrated in FIG. 10D has 5 bits having a value of 1 from among the 8 bits, which therefore means that the input data is thinned-out at a rate of ⅝, i.e. 62.5% (the density of the post-thinning-out data is 62.5% the density of the pre-thinning-out data).

In FIG. 10F, 33 of the pixels have dots arranged in them (25.8% density). On the other hand, in FIG. 10H, the number of pixels having dots arranged in them is the same, 33, as in FIG. 10F.

While the dot arrangement shows slightly different results depending on whether the thinning-out processing uses binary data or multivalued data, the density results are the same. Further, the thinning-out rate for both processes is 62.3%, which is about the same rate as that when the bit value in the mask pattern is 1. Considering that in recent years dot resolution has been increasing, it can be said that the difference in dot arrangement is not a difference which can be recognized in image quality.

<Data Conversion Apparatus>

FIG. 3 is a block diagram describing the data conversion apparatus 300.

The data conversion apparatus 300 reads data of a certain amount (e.g., an 8 unit amount) from a memory 309, converts the data, and then writes the converted data into the memory 309.

A first control unit 301 controls the reading and the writing of the memory 309. The first control unit 301 manages the address where the reading is performed and the address where the writing is performed in the memory 309. A first memory 302 holds the 8 unit amount of data read from the memory 309. A register 303 holds a one unit amount of data read from the first memory 302. An arithmetic unit 304 performs the above-described data conversion. A register 305 holds a conversion pattern which is used in the conversion by the arithmetic unit 304. A register 306 holds the results calculated by the arithmetic unit 304. A second memory 307 holds an 8 unit amount of the converted data.

A second memory control unit 308 controls access to the first memory 302 and the second memory 307. The second memory control unit 308 reads in order in single units an 8 unit amount of data stored in the first memory 302, and stores the converted data in order in the second memory 307. Further, the second memory control unit 308 controls storage processing and reading processing of the register 303 and register 306.

The first memory control unit 301 and the second memory control unit 308 communicate with each other to perform transfer control of the data.

The data conversion apparatus 300, for example, acquires information regarding the kind of data of the conversion target, and performs data conversion processing based on that information. Such information includes, for example, information regarding whether the data is multivalued data or binary data, information regarding whether there are 8 bits or 16 bits per unit, and information regarding the conversion pattern to be used.

Figure 5:
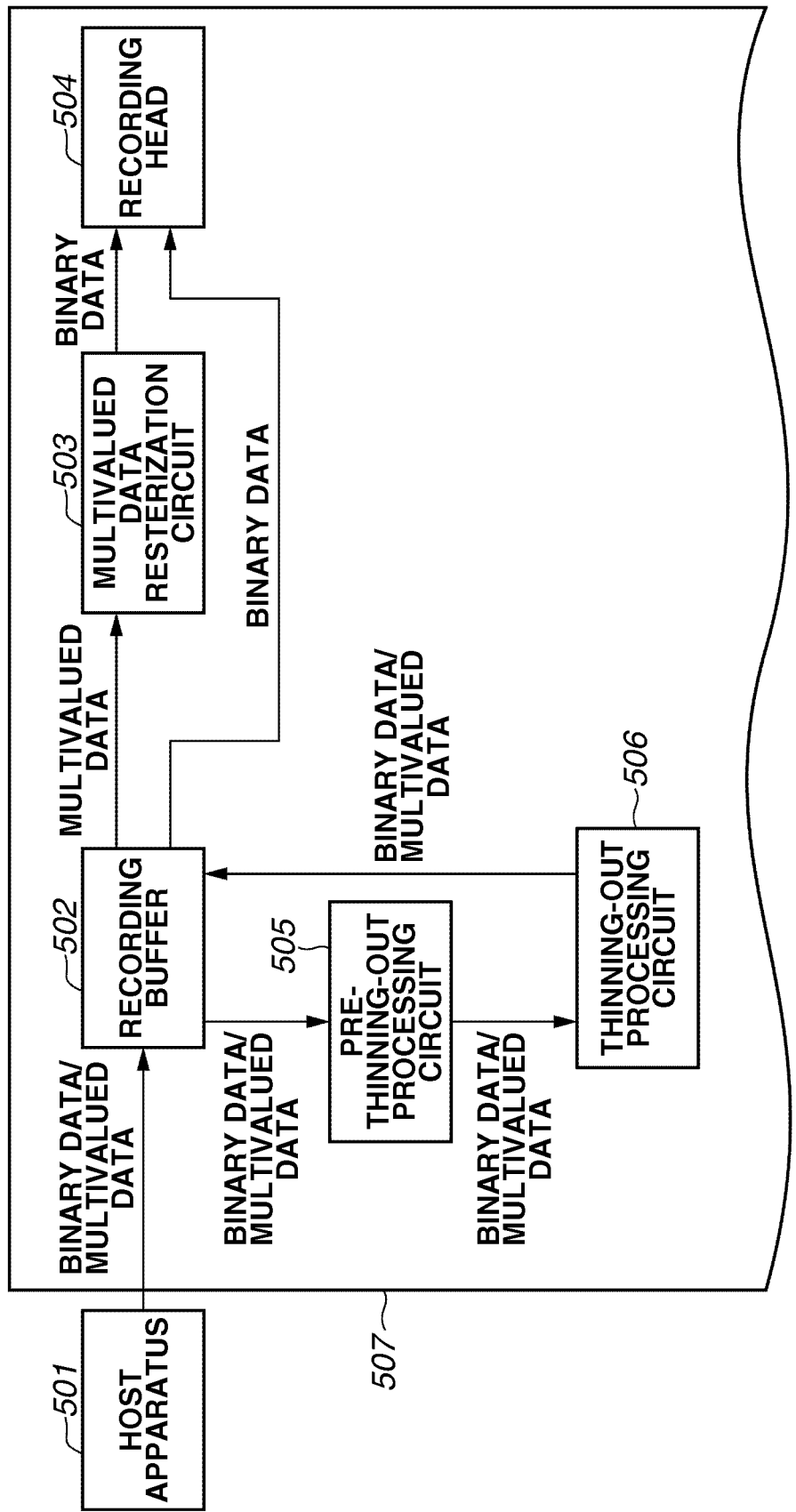
FIG. 5 is a control block diagram of the recording apparatus according to an exemplary embodiment of the present invention.

FIG. 5 is a functional block diagram of a recording apparatus (inkjet recording apparatus) 507 which is one example to which the data conversion apparatus 300 can be applied. This recording apparatus 507 records an image on a recording medium by scanning with a recording head 504 like that illustrated in FIG. 11. The recording is performed in scanning (band) units. In the recording head 504, the number of nozzles arrayed in the feed direction is 128.

Figure 12A:
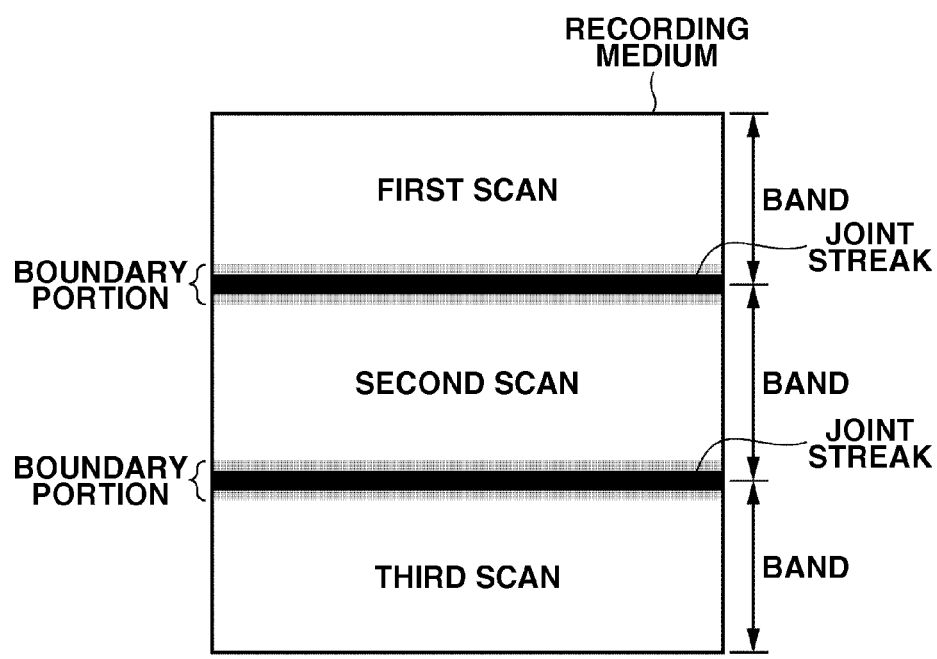
FIGS. 12A and 12B are diagrams for describing the boundary portion between bands when recording an image onto a recording medium of the recording apparatus used in an exemplary embodiment of the present invention.
Figure 12B:
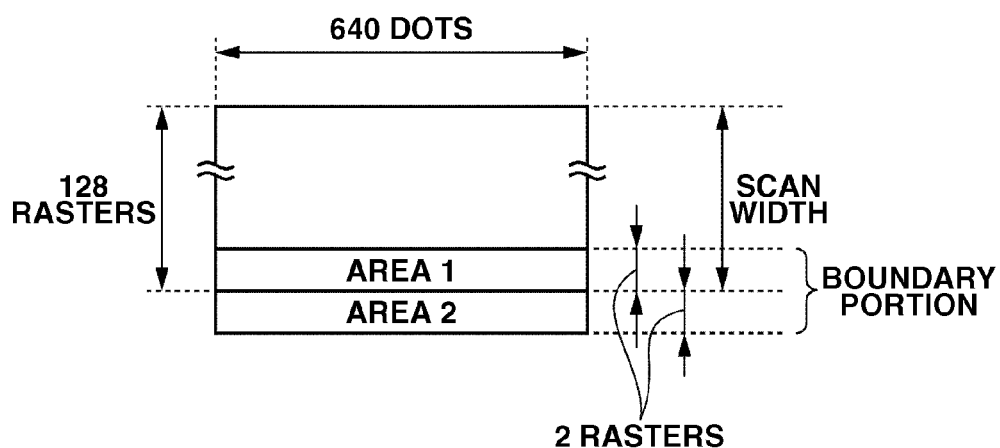

In this case, as illustrated in FIG. 12A, when recording on the recording medium, joint streaks (connecting stripes) appear at a boundary portion between adjacent bands. Conversion (thinning-out) processing is performed on the data at this boundary portion. FIG. 12B is a diagram describing a boundary portion. Here, an example is illustrated for a case where recording is performed on a recording medium in a 640 dot amount in a scanning direction.

As illustrated in FIG. 12B, the boundary portion is divided into two regions in a feed direction (area 1 and area 2), and the data corresponding to those regions is converted. When thinning-out processing is performed on area 1 for example, as illustrated in FIGS. 10A to 10H, the processing is performed in 128 pixel units in a scanning direction. In FIG. 12, the thinning-out processing is performed in order from the left side of the figure.

Next, with reference to FIG. 5, a case where the recording apparatus 507 records by receiving multivalued data from a host apparatus (computer terminal apparatus) 501 will be described. The multivalued data is temporarily stored in a receiving buffer (not shown) along with a command and the like, and then stored in a recording buffer 502.

From among the stored data, a pre-thinning-out processing circuit 505 reads the data of the address corresponding to the region of the band boundary illustrated in FIG. 12B, and performs a thinning-out pre-processing calculation. A thinning-out processing circuit 506 subjects the data received from the pre-thinning-out processing circuit 505 to thinning-out processing, and writes the data in a predetermined address of the recording buffer 502. A multivalued data rasterization circuit 503 reads data from the recording buffer in order, rasterizes the read data into binary data, and transfers the rasterized data to the recording head 504. The pre-thinning-out processing circuit 505, thinning-out processing circuit 506, and multivalued data rasterization circuit 503 may be, for example, implemented as a one-chip application specific integrated circuit (ASIC) including a central processing unit (CPU).

The processing performed in the multivalued data rasterization circuit 503 will now be described using FIG. 6. The reference numerals 601 to 604 in FIG. 6 indicate conversion tables (rasterization tables) which convert (rasterize) 2-bit multivalued data into binary data. This conversion converts 600 dpi 2-bit multivalued data into 1200 dpi binary data.

This multivalued data is expressed as 2 bits per pixel. Gradation that can be expressed as 2 bits can be expressed as four tonal levels of 0 to 3. This value is called the index value. As illustrated in FIG. 6, one piece of 2-bit multivalued data is converted into four 1200 dpi×1200 dpi dots. Such a conversion table is also provided.

For example, if a given pixel has an index value of 2 ("10"), table 603 is selected, and the upper left and lower right dots are selected. Further, if a given pixel has an index value of 1 ("01"), table 602 is selected, and the upper left dot is selected. If the recording apparatus is an inkjet recording apparatus, a total of 2 dots of ink corresponding to this dot are discharged.

Thus, the 2-bit multivalued data is as a result converted into 4-bit binary data. Therefore, for 2-bit multivalued data, the amount of data required to record an image with the same resolution is half that for binary data.

In the pre-thinning-out processing circuit 505, the ink dot discharge number for each color in the joint streak region which is the target of the thinning-out processing is acquired by counting the index value of the multivalued data. In the thinning-out processing circuit 506, thinning-out processing is performed by selecting one mask pattern from among a plurality of thinning-out mask patterns which have different thinning-out rates based on the ink dot discharge amount acquired by the pre-thinning-out processing circuit 505.

The exemplary embodiment according to the present invention is not limited to the numbers and values described above.

For example, while the conversion pattern was expressed as 8 bits, other embodiments may be expressed as 16 bits or 32 bits.

Further, expression of the multivalued data is not limited to 2-bit multivalued data or 4-bit multivalued data. The multivalued data may also be expressed as 3-bit multivalued data, 5-bit multivalued data, and the like. Moreover, the resolution of the data, this is not limited to 1200 dpi. A resolution of 2400 dpi, 4800 dpi, and the like may also be applied.

Furthermore, while the amount of data held by the data conversion apparatus 300 was an 8 unit amount, the present invention is not limited to this value. In addition, while the memory control unit was divided into two, a first memory control unit 301 and a second memory control unit 308, a configuration using one memory control unit may also be employed.

The above-described structure can be applied to any device using a recording medium made of paper, cloth, leather, non-woven fabric, paper for an overhead projector and the like, as well as a recording medium made of metal and the like. Specific examples of applicable devices include office equipment such as printers, copiers, and facsimile machines, and production equipment for industry.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image processing apparatus comprising:
a memory; and
one or more circuits configured to perform operations comprising:
acquiring image data indicating recording or non-recording of a dot in a unit region; and
in a case where the image data acquired in the acquiring is first image data of K bits having a K pixel amount of data in which one bit in the image data indicates recording or non-recording of a dot of each pixel, converting K bits of the image data, in every one bit, into a value based on information corresponding to one bit of conversion data for reducing a number of recording dots corresponding to the image data,
and, in a case where the image data acquired in the acquiring is second image data of K bits having a plurality of units of data in which N bits of the image data, N being an integer equal to or larger than 2, designates one pattern indicating recording or non-recording of a dot of each pixel in one unit comprising a plurality of pixels, converting K bits of image data, in every N bits, into a value based on information corresponding to N bits of the conversion data.

2. The image processing apparatus according to claim 1, wherein an array of K bits of the first and second image data correspond to a scanning direction of a recording head which performs recording on a recording medium using recording data, and one unit in the second data comprises a plurality of pixels belonging to a plurality of rasters.

3. The image processing apparatus according to claim 1, wherein 2 bits of the second image data designate one pattern defining recording or non-recording of a dot of each pixel in a unit consisting of 4 pixels.

4. The image processing apparatus according to claim 1, wherein the unit region is a region in the vicinity of a boundary between bands recorded by different scannings of a recording head.

5. An image processing method comprising:
acquiring image data indicating recording or non-recording of a dot in a unit region; and
in a case where the image data acquired in the acquiring is first image data of K bits having a K pixel amount of data in which one bit in the image data indicates recording or non-recording of a dot of each pixel, converting K bits of the image data, in every one bit, into a value based on information corresponding to one bit of conversion data for reducing a number of recording dots corresponding to the image data,
and, in a case where the image data acquired in the acquiring is second image data of K bits having a plurality of units of data in which N bits of the image data, N being an integer equal to or larger than 2, designates one pattern indicating recording or non-recording of a dot of each pixel in one unit comprising a plurality of pixels, converting K bits of image data, in every N bits, into a value based on information corresponding to N bits of the conversion data.

6. The image processing method according to claim 5, wherein an array of K bits of the first and second image data correspond to a scanning direction of a recording head which performs recording on a recording medium using recording data, and one unit in the second data comprises a plurality of pixels belonging to a plurality of rasters.

7. The image processing method according to claim 5, wherein 2 bits of the second image data designate one pattern defining recording or non-recording of a dot of each pixel in a unit consisting of 4 pixels.

8. The image processing method according to claim 5, wherein the unit region is a region in the vicinity of a boundary between bands recorded by different scannings of a recording head.

9. An image processing apparatus comprising:
a memory; and
one or more circuits configured to perform operations comprising:
acquiring image data indicating recording or non-recording of a dot in a unit region; and
in a case where the image data acquired in the acquiring step is first image data of K bit having a K pixel amount of data in which one bit in the image data indicates recording or non-recording of the dot of each pixel, processing the image data in every one bit and converting a value of one bit of the image data into a value of one bit of conversion data for reducing a number of recording dots corresponding to the image data,
and in a case where the image data acquired in the acquiring step is second image data having a plurality of units of data in which N bits of the image data, N being an integer equal to or larger than 2, designates a pattern indicating recording or non-recording of a dot of each pixel in one unit comprising a plurality of pixels, processing the image data in every N bits, and converting a value of N bits of the image data into a value based on a value of a predetermined number of bits in the conversion data, the predetermined number determined based on the value of the N bit which is the processing target of the image data.

10. The image processing apparatus according to claim 9, wherein the converting step, in a case where the first image data is processed, comprises converting each of a plurality of different pixel values of the image data into each of the bit value which the conversion data differs, and in a case where the second image data is processed, comprises converting each of the value of the units of the plurality of different N bits of the image data into a value based on each of the value of bits which the conversion data differs.

11. The image processing apparatus according to claim 9, wherein the converting step, in a case where the first image data is processed, comprises converting a value corresponding to pixels which the first image data indicates record of the dots into a value of one bit of the conversion data, and in a case where a pattern which value of N bits of the second image data indicates recording of the dot to at least one pixel in the unit is designated, when the first image data does not perform conversion of value corresponding to pixels that does not indicate recording of the dot and when the second image data is processed, comprises converting value of N bits of the image data into a value based on a value of the predetermined number of bits in the conversion data, and in a case where a pattern of the value of N bits of the second image data does not indicate recording of the dots in any of the pixels in the unit, conversion of value of the N bits is not performed.

12. The image processing apparatus according to claim 9, wherein array of bits of the first and second image data correspond to a scanning direction of a recording head which performs recording on a recording medium using recording data, and one unit in the second image data comprises a plurality of pixels belonging to plurality of rasters.

13. The image processing apparatus according to claim 9, wherein 2 bits of the second image data designate one pattern defining recording and non-recording of a dot of each pixel in a unit consisting of 4 pixels.

14. The image processing apparatus according to claim 9, wherein the unit region is a region in the vicinity of a boundary between bands recorded by different scannings of a recording head.

15. The image processing apparatus according to claim 9, the operations further comprising:
recording by providing recording materials to a recording medium based on image data which conversion is performed in the converting step.

16. An image processing apparatus comprising:
a memory; and
one or more circuits configured to perform operations comprising:
acquiring image data having a plurality of units of data in which N bits of the image data, N being an integer equal to or larger than 2, designates a pattern indicating recording or non-recording of a dot of each pixel in one unit comprising a plurality of pixels, which is an image data that indicates recording and non-recording of dots to unit region; and
processing the acquired image data in every N bits and converting value of N bits of the image data into a value based on a value of a predetermined number of bits in conversion data, the predetermined number being based on the value represented by the N bits of the processing target of the image data.

17. The image processing apparatus according to claim 16, wherein an array of bits of the image data correspond to a scanning direction of a recording head which performs recording on a recording medium using recording data, and one unit in the image data comprises a plurality of pixels belonging to a plurality of rasters.

18. The image processing apparatus according to claim 16, wherein the unit region is a region in the vicinity of a boundary between bands recorded by different scannings of a recording head that discharges ink while scanning on the recording medium and performing recording.

19. An image processing method comprising:
acquiring image data indicating recording or non-recording of a dot in a unit region; and
in a case where the image data acquired in the acquiring step is first image data of K bit having a K pixel amount of data in which one bit in the image data indicates recording or non-recording of the dot of each pixel, processing the image data in every one bit and converting a value of one bit of the image data into a value of one bit of conversion data for reducing a number of recording dots corresponding to the image data,
and in a case where the image data acquired in the acquiring step is second image data having a plurality of units of data in which N bits of the image data, N being an integer equal to or larger than 2, designates a pattern indicating recording or non-recording of a dot of each pixel in one unit comprising a plurality of pixels, processing the image data in every N bits, and converting a value of N bits of the image data into a value based on a value of a predetermined number of bits in the conversion data, the predetermined number determined based on the value of the N bit which is the processing target of the image data.

20. The image processing method according to claim 19, wherein the converting step, in a case where the first image data is processed, comprises converting each of a plurality of different pixel values of the image data into each of the bit value which the conversion data differs, and in a case where the second image data is processed, comprises converting each of the value of the units of the plurality of different N bits of the image data into a value based on each of the value of bits which the conversion data differs.

21. The image processing method according to claim 19, wherein the converting step, in a case where the first image data is processed, comprises converting a value corresponding to pixels which the first image data indicates record of the dots into a value of one bit of the conversion data,
and in a case where a pattern which value of N bits of the second image data indicates recording of the dot to at least one pixel in the unit is designated, when the first image data does not perform conversion of value corresponding to pixels that does not indicate recording of the dot and when the second image data is processed, comprises converting value of N bits of the image data into a value based on a value of the predetermined number of bits in the conversion data,
and in a case where a pattern of the value of N bits of the second image data does not indicate recording of the dots in any of the pixels in the unit, conversion of value of the N bits is not performed.

22. The image processing method according to claim 19, wherein array of bits of the first and second image data correspond to a scanning direction of a recording head which performs recording on a recording medium using recording data, and one unit in the second image data comprises a plurality of pixels belonging to plurality of rasters.

23. The image processing method according to claim 19, wherein 2 bits of the second image data designate one pattern defining recording and non-recording of a dot of each pixel in a unit consisting of 4 pixels.

24. The image processing method according to claim 19, wherein the unit region is a region in the vicinity of a boundary between bands recorded by different scannings of a recording head.

25. The image processing method according to claim 19, further comprising:

recording by providing recording materials to a recording medium based on image data which conversion is performed in the converting step.

* * * * *